Figure 1:
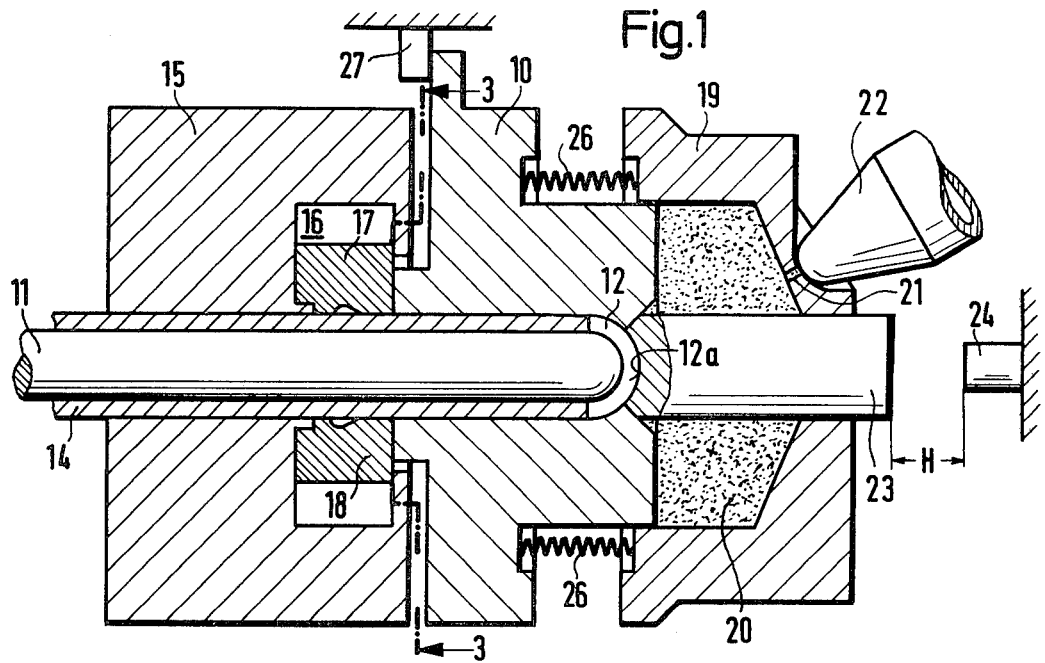

United States Patent [19]

Rose

[11] 4,071,532
[45] Jan. 31, 1978

[54] METHOD FOR MANUFACTURING PLASTICS BLANKS

[75] Inventor: Peter Rose, Henstedt-Ulzburg, Germany

[73] Assignee: Heidenreich & Harbeck Zweigniederlassung der Gildemeister AG, Hamburg, Germany

[21] Appl. No.: 631,985

[22] Filed: Nov. 14, 1975

Related U.S. Application Data

[62] Division of Ser. No. 515,831, Oct. 18, 1974, Pat. No. 3,947,203.

[30] Foreign Application Priority Data

Dec. 21, 1973 Germany .......................... 2364004

[51] Int. Cl.² .............. B29F 1/06; B29F 1/14
[52] U.S. Cl. .................... 264/328; 264/97; 264/334

[58] Field of Search .......... 264/89, 94, 97, 328, 264/334; 425/242 B, 242 R, 244, 245, 247, 249, DIG. 209

[56] References Cited

U.S. PATENT DOCUMENTS

| | | | |
|---|---|---|---|
| 3,347,965 | 10/1967 | Valyi | 264/97 |
| 3,503,095 | 3/1970 | Uhlig | 425/DIG. 209 |
| 3,590,114 | 6/1971 | Uhlig | 264/328 |
| 3,776,991 | 12/1973 | Marcus | 264/97 X |
| 3,778,211 | 12/1973 | Moen et al. | 425/245 R |
| 3,855,380 | 12/1974 | Gordon et al. | 264/97 |

*Primary Examiner*—Jan H. Silbaugh
*Attorney, Agent, or Firm*—Cullen, Settle, Sloman & Cantor

[57] ABSTRACT

Method for manufacturing blanks from a synthetic plastics material includes a mould cavity defined between a mandrel and an outer mould. A retractable sleeve is slidably mounted on the mandrel and is displaceable within the cavity at a rate which depends on the rate at which the plastics material is injected into the cavity.

1 Claim, 3 Drawing Figures

METHOD FOR MANUFACTURING PLASTICS BLANKS

This is a division of application Ser. No. 515,831 filed Oct. 18, 1974, and now U.S. Pat. No. 3,947,203.

FIELD OF THE INVENTION

This invention relates to a method for manufacturing blanks from a synthetic plastics material which is injected under pressure into a mould cavity formed between a mandrel and an outer mould.

Blanks of this kind are needed as a basic product in the manufacture of containers, in particular plastics bottles. The blank is normally a relatively long thin-walled structure, the wall strength of which should be as uniform as possible.

BACKGROUND OF THE INVENTION

In the manufcture of plastics blanks, it is known to inject plastics material into a cavity formed between a separable outer mould and a fixed mandrel. Thus the injection of the plastics material takes place centrally of the blank and at the end of the cavity adjacent the free end of the mandrel.

It has become apparent that, with high pressure injection of the plastics material, the mandrel can be bent or warped because of uneven rates of flow of the plastics material around the mandrel. Blanks with considerably varying wall thickness and strength are produced by bending of the mandrel and this causes difficulties in the subsequent blow-moulding process. The warp on the mandrel is all the more apparent, the longer the mandrel. The length of the mandrel can be five to ten times as much as its diameter. With continued use of blanks with varying wall strengths and thicknesses the quality of the bottles being manufactured is considerably reduced and the productivity of the bottle producing machine suffers accordingly.

Moreover, streaks and swirls can form in the blanks as a result of uncontrolled injection of the plastics material, which streaks and swirls adversely affect the quality of the blanks.

SUMMARY OF THE INVENTION

According to the invention there is provided a method as referred to above wherein a retractable sleeve is provided within the cavity and is displaceable within the cavity at a rate dependent on the rate of injection of plastics material into the cavity.

Thus the sleeve is in a forward position in the cavity at the beginning of the processs of injection of the plastics material and the mandrel is supported substantially throughout its length by the sleeve. As soon as the plastics material enters the forward end of the cavity and fills it the sleeve is displaced rearwardly. This rearward motion of the sleeve is controlled so that the volume of the cavity thereby vacated is always equal to the volume of the amount of plastics material which has been injected. Inadmissibly high and uneven injection speeds and correspondingly uneven rates of flow are avoided by the equal volume displacement of the sleeve. During the entire filling process the plastics material is injected much more evenly and at a constant speed into the cavity around the head of the mandrel.

By this equal volume displacement of the sleeve the manufacture of blanks is made much more accurate and the influence of uncontrolled events during injection is avoided as are the consequences connected therewith, such as streaks or swirls in the blank and bending of the mandrel.

The apparatus for manufacturing blanks can be developed in a number of ways. Thus the equal volume displacement of the retractable sleeve may be effected in dependence on the forward movement of an extruder screw or injection piston. Rearward displacement of the retractable sleeve and forward movement of the extruder screw or injection piston for the plastics material must occur in equal volume relationships. In this way, the plastics material does not shoot in an uncontrolled manner into the empty mould cavity, but is fed into it at a constant rate, since the volume inserted is always equal to the volume of the cavity vacated by the sleeve.

The equal volume displacement of the retractable sleeve can also be dependent on forward movement of the outer mould. Thus the plastics material may be displaced upon movement of the outer mould from a chamber into the mould cavity, the rearward movement of the sleeve being of equal volume relationship to the displaced volume of plastics material. The required relationship between the outer mould feed movement and the sleeve displacement is thereby maintained.

According to a further feature of the invention, the outer mould is movable relative to a fixed cylinder containing a chamber which is connected to a supply nozzle in which the connection between the chamber and the mould cavity is controlled by a displaceable shaft. The chamber in the cylinder is initially filled with the plastics material through the supply nozzle while the opening for the flow of plastics material into the mould cavity is blocked by the shaft. The sleeve is in its forward position near the end wall of the mould cavity, which end wall is formed at least in part by the adjacent surface of the shaft. After the shaft has been pulled back and the outer mould is inserted into the cylinder, the plastics material is caused to flow out of the chamber into the mould cavity where the equal volume displacement of the sleeve takes place. Inward movement of the outer mould is completed as soon as it engages the shaft which bears against a stop so the mould cavity is thereby blocked off.

According to a further feature of the invention a mould part is provided axially adjacent the outer mould, within which mould part is a recess containing two split ring moulds for forming the necks of the blanks. A hydraulic piston and cylinder mechanism controls movements of the sleeve, and the mould part acting on the outer mould, and to separate the split ring moulds.

The construction of the apparatus is particularly facilitated if the outer mould and the mould part are each of unitary construction. Means may be provided whereby the mould part can be pulled back away from the outer mould to enable the removal of the moulded blank from the outer mould. Assuming that the split ring moulds are then opened, moulded blanks can be taken off the mandrel by retraction of the sleeve. Both split ring moulds are preferably movable within the undivided mould part so that the opening movement thereof takes place uniformly so as to avoid any damage to the necks of the moulded blanks during said opening movement.

Figure 2:
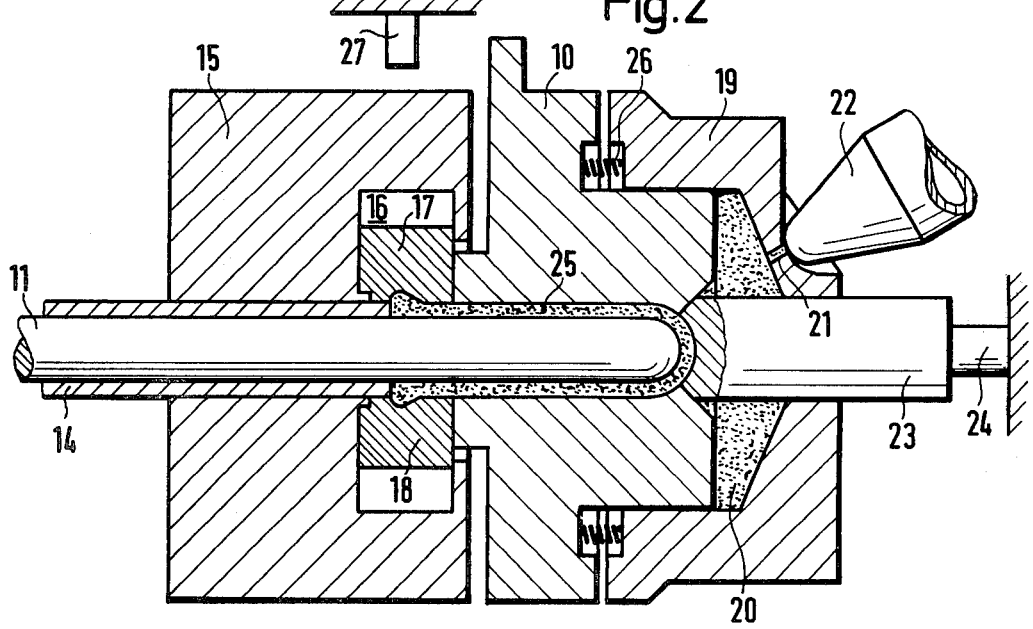
Figure 3:
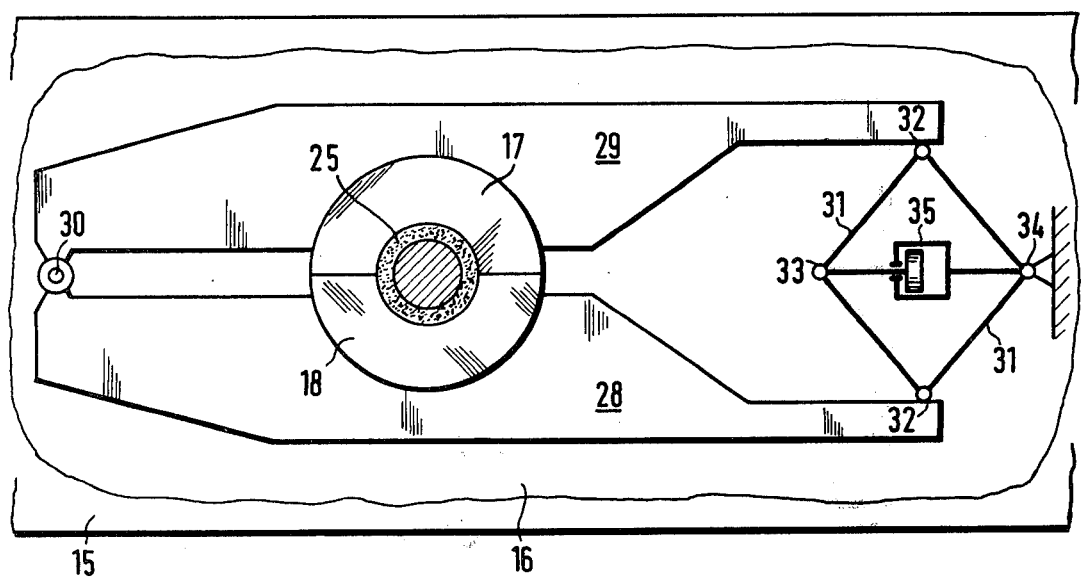

The invention will now be described by way of example with reference to one embodiment shown in the accompanying drawings, in which:

FIG. 1 is a sectional view of the moulding apparatus at the beginning of the moulding process, FIG. 2 is a sectional view showing the relative positions of the parts of the apparatus at the end of the moulding process, and FIG. 3 is a section along the line 3—3 of FIG. 1.

The apparatus shown in the drawing includes an outer mould 10 of unitary construction and a mandrel 11, which between them define an annular mould cavity. A sleeve 14 is disposed between the outer mould 10 and the mandrel 11 such that it can be displaced longitudinally. In FIG. 1 the sleeve 14 is shown in its forward position, in which the mandrel is supported substantially throughout the whole of its length and only the inner end portion of the cavity 12 is empty.

The mandrel 11 and the sleeve 14 extend through a bore in a mould part 15 which is of unitary construction and is retractable longitudinally quite independently of the outer mould 10. The mould part 15 is formed with a recess 16 in which two split ring moulds 17 and 18 are arranged, and the split moulds 17 and 18 can be opened, in the manner shown in FIG. 3, to permit removal of a moulded blank. The split ring moulds 17 and 18 are formed with rebates as shown as these rebates serve to form the neck of a moulded blank. The mandrel 11 and the sleeve 14 are mounted on a fixed base structure (not shown) on which the mould part 15 is also mounted.

The front portion of the outer mould 10 is displaceable within a cylinder 19 containing a chamber 20 which is filled with plastics material through an opening 21 by means of an injection nozzle 22. In the cylinder 19 there is a longitudinally displaceable shaft 23, the forward end surface of which constitutes an end wall 12a of the mould cavity 12. In the position shown in FIG. 1, the shaft 23 separates the chamber 20 from the mould cavity 12. The shaft 23 can be pushed back against a stop 24 to provide an opening through which the plastics material can flow into the mould cavity 12.

The process of manufacturing a moulded blank, for use in, for example, a blow-moulding apparatus, is such that the plastics material is first of all injected into the chamber 20 within the cylinder 19 through the injection nozzle 22 and the temperature is controlled in that chamber by heating elements (not shown). The chamber 20 is closed, during injection of the plastics material, by the shaft 23 which abuts a frusto-conical surface of the outer mould 10 as shown in FIG. 1. The chamber 20 is of somewhat larger volume than the moulded blank to be manufactured.

After the chamber 20 has been filled with hot plastics material, communication is established between the chamber 20 and the mould cavity 12 by pulling back the shaft so that it bears against the stop 24. Simultaneously the mould part 15 is pushed forwards together with the outer mould 10 by a hydraulic piston and cylinder mechanism (not shown) and the plastics material displaced by insertion of the outer mould 10 into the chamber 20 is caused to flow into the mould cavity 12 through an opening of fairly large section. The outer mould 10 and the sleeve 14 are displaced by related amounts and the relationship between the rate of forward movement of the outer mould 10 and the rate of backward movement of the sleeve 14 must be so fixed that the volume of plastics material caused to flow into the mould cavity is equal to the volume of the sleeve 14 effectively withdrawn from the cavity 12.

A biasing force initially acts on the sleeve 14 to urge it into the position shown in FIG. 1 and this must be overcome during retraction, so that no cavities are formed in the moulded blank. Moreover, inadmissibly high uneven injection speeds are avoided by retraction of the sleeve 14 and advance of the outer mould 10 at controlled rates. The plastics material is caused to flow into the mould cavity 12 around the head of the mandrel at a constant speed throughout the entire moulding process. Since the sleeve 14 is initially in the forward position, the plastics material cannot squirt or flow rapidly into the adjacent portion of the mould cavity and therefore produce inadmissibly high and uneven rates of flow which can result in bending of the mandrel 11, which is, moreover, substantially supported throughout its length by the sleeve 14.

When the outer mould 10 and the mould part 15 have reached their final positions as shown in FIG. 2, the process of filling the mould cavity 12 is completed and the passage for the flow of the plastics material out of the chamber 20 is blocked by the shaft 23, which is situated against the stop 24. When the outer mould 10 is in this position, the sleeve 14 is in its final position between the split ring moulds 17 and 18 whereby a neat neck is formed on the moulded blank. This final position of the sleeve 14 is determined by a stop, not shown. The blank 25 manufactured in this way is then allowed to harden or set. The coolant channels required for this are not shown.

After the moulded blank has hardened or set the mould part 15 is withdrawn axially together with the sleeve 14 and the blank 25 on the mandrel 11, the outer mould 10 being urged back to engage a stop 27 by springs 26. At the same time the shaft 23 returns to its final forward position as shown in FIG. 1.

When the moulded blank has been withdrawn sufficiently so as to be clear of the outer mould 10 the split ring mould parts 17 and 18 are opened and the sleeve 14 is moved back towards its initial position, as shown in FIG. 1. The moulded blank 25 is released from the mandrel 11 by this movement of the sleeve and can fall into a container. The mould part 15, the mandrel 11 and the sleeve 14 are then returned to their initial positions and the injection process is repeated after the chamber 20 has been refilled with the plastics material. Stops (not shown) are provided for determining the final position of the sleeve.

In FIG. 3 both split ring mould parts 17 and 18 are shown in end view; they are fixed in two arms 28 and 29 which span the recess 16 of the mould part 15. The ends of the arms 28 and 29 are pivotally connected at 30 for pivotal movement relative to the mould part 15, while the free ends of the arms 28 and 29 are spaced apart and connected together by a parallelogram linkage which is made up of four separate links 31 which are connected to the arms by pivotal connections 32 and to each other by pivotal connections 33 and 34. The connection 34 is fixed to the mould part 15. The split ring mould parts 17 and 18 are opened and closed evenly and uniformly by a hydraulic piston and cylinder mechanism 35 situated between the connections 33 and 34.

An important advantage of the apparatus is its space-saving construction, so that it is especially suited to the simultaneous injection of several blanks. In addition, only the small ring mould for making the neck portion of the blank needs to be made in two parts, while the outer mould 10 and the mould part 15 are not split. Production and operating costs are thereby reduced.

I claim:

1. In a method of forming plastic blanks, the steps of:

1. accumulating flowable plastic material in a chamber defined by a fixed accumulator and an end portion of an outer movable mold, said outer mold including a cavity in which a movable cylindrical core pin is concentrically positioned to define a mold cavity for forming plastic blanks, and said outer mold including a passageway extending from the end thereof to said cavity;
2. during Step (1), (A) closing the mold passageway with a retractable shaft which extends through the accumulator chamber and (B) axially confining a pair of radially movable neck rings between the outer mold and an axially displaceable end plate;
3. thereafter, displacing the shaft from the closing position to a retracted position to establish fluid communication between the accumulator chamber and the mold cavity;
4. relatively moving the accumulator with respect to the outer mold, the core pin, the neck rings, and the end plate to move the mold end portion into the accumulator chamber to force plastic material through the passageway into the mold cavity;
5. during Step (4), (A) relatively moving the retractable shaft and the mold passageway toward each other, (B) retracting a tubular sleeve from within the mold cavity against a biasing force in response to the flow of plastic material into the cavity, (C) withdrawing the sleeve through the neck rings to expose a neck ring cavity, and (D) axially confining the neck rings between the outer mold and the end plate;
6. terminating the relative movement of the accumulator and the outer mold upon re-engagement of the mold passageway and the retractable shaft;
7. axially displacing the end plate, neck rings, core and sleeve away from the accumulator to telescopically withdraw the core with the plastic material thereon from the mold cavity;
8. during the performance of Step (7), maintaining the end plate, neck rings, sleeve and core pin in a fixed relationship with respect to each other;
9. radially displacing the neck rings away from the core pin to release the molded neck of the plastic material; and
10. displacing the sleeve relative to the core toward the outer mold to eject the plastic material from the core as a molded article.

* * * * *